Aug. 5, 1930.  F. H. ROSENCRANTS  1,772,290
APPARATUS FOR FEEDING PULVERIZED FUEL TO FURNACES
Filed April 29, 1927  2 Sheets-Sheet 1

Inventor
Fay Harry Rosencrants
By his Attorneys
Synnestvedt & Lechner

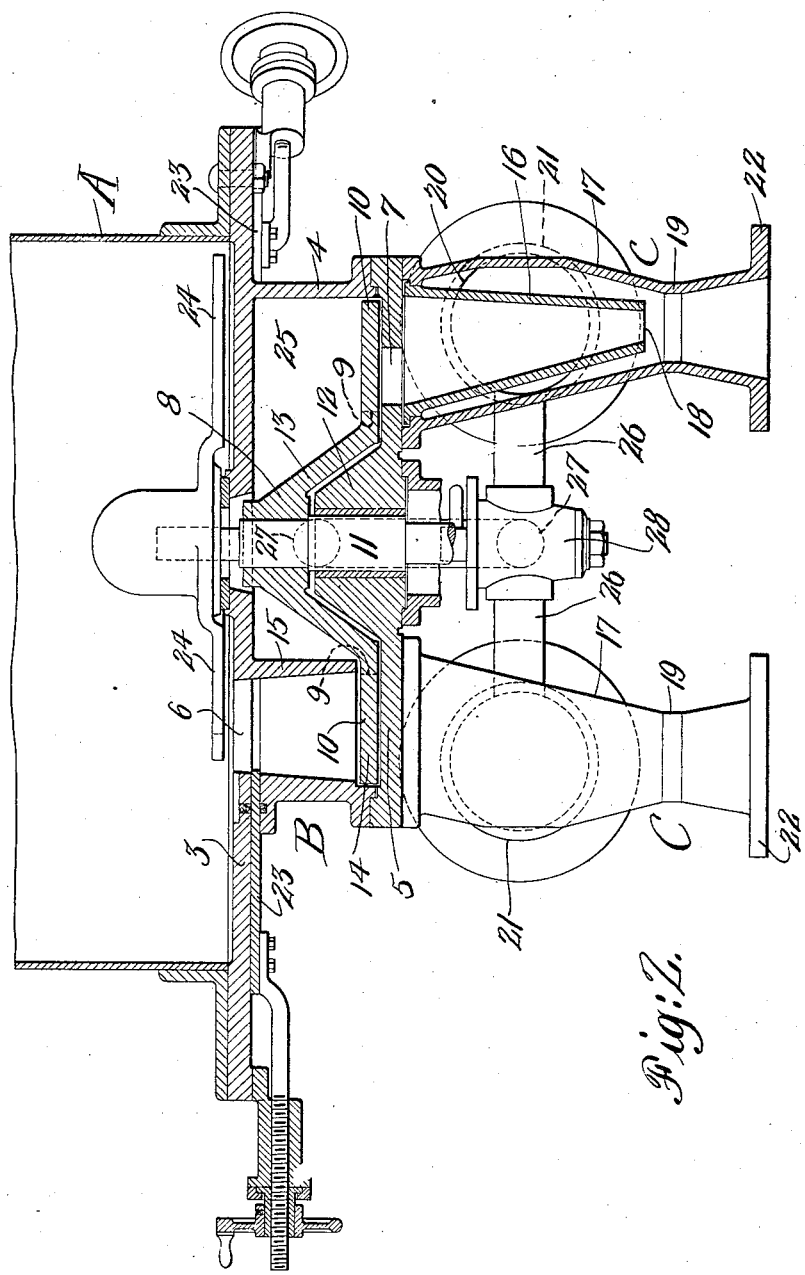

Patented Aug. 5, 1930

1,772,290

UNITED STATES PATENT OFFICE

FAY HARRY ROSENCRANTS, OF LONDON, ENGLAND, ASSIGNOR TO INTERNATIONAL COMBUSTION ENGINEERING CORPORATION, OF NEW YORK, N. Y., A CORPORATION OF DELAWARE

APPARATUS FOR FEEDING PULVERIZED FUEL TO FURNACES

Application filed April 29, 1927, Serial No. 187,496, and in Great Britain May 1, 1926.

This invention relates to feeders for feeding pulverized fuel and the like and is particularly useful for the feeding of fuel directly to furnaces for burning.

One of the primary objects of my invention is the provision of an effective feeder in which uninterrupted and uniform flow of material is obtained.

A further object is the provision in a feeder of the character described of means for preventing arching of the material in the bin.

Another object of the invention is to provide a feeder in which rapid wear of the parts with consequent change in capacity for a given speed and other difficulties are avoided.

Still another object is to provide a feeder in which the proportion of fuel to air blast may be effectively controlled.

How the foregoing, together with such other objects and advantages as may hereinafter appear, or are incident to my invention, are realized is illustrated in preferred form in the accompanying drawings, wherein—

Fig. 2 is a vertical section taken substantially on the line 2—2 of Fig. 1.

Figure 1:
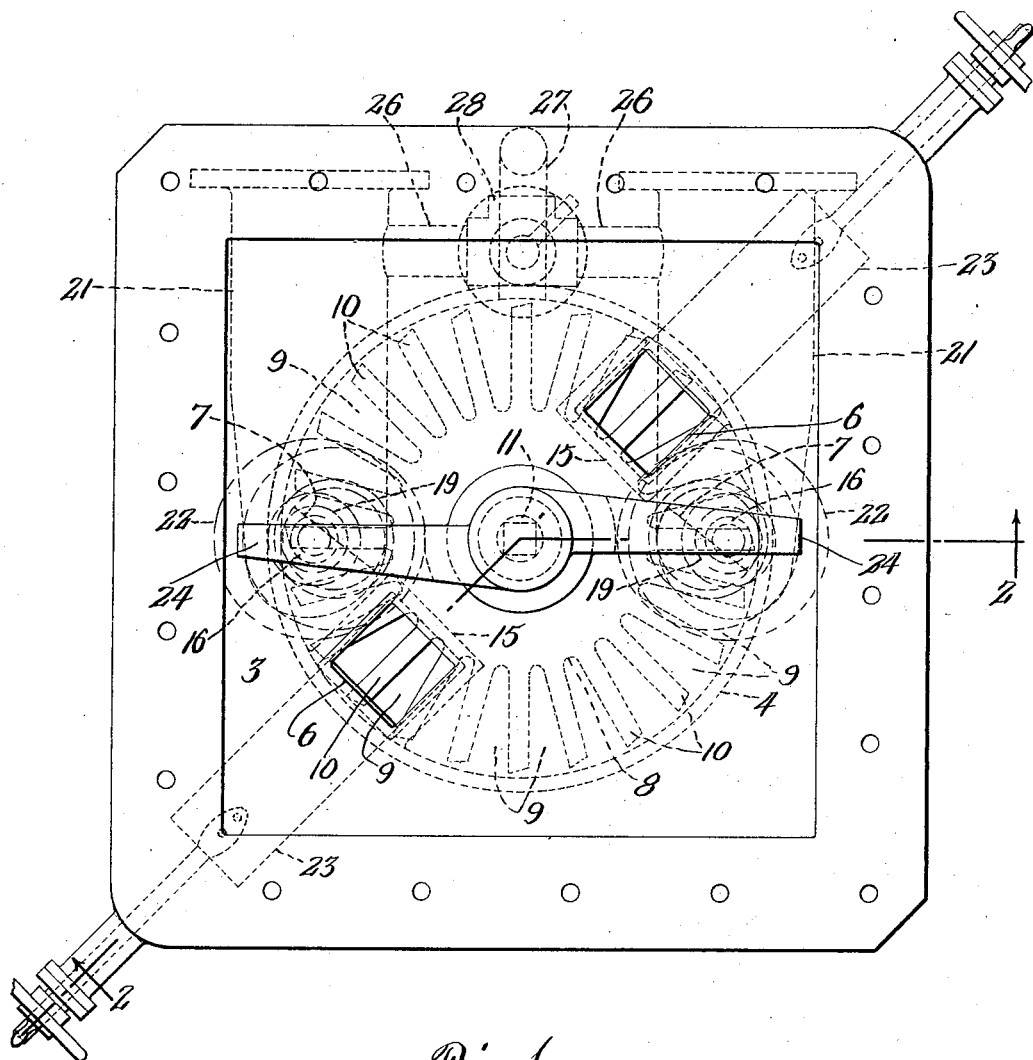
Fig. 1 is a plan view of a feeder embodying my improvements.

As shown in the accompanying drawing, the device comprises, in general, a bin or hopper A, feed means B and a delivery line or lines C. The bin or hopper A is provided with an apertured bottom 3, and a portion or throat 4 extending downwardly from said bottom, which throat is also provided with an apertured bottom indicated by the numeral 5. In this instance the hopper bottom 3 is provided with two apertures 6, 6, and the throat bottom 5 is provided with two apertures 7, 7, preferably semi-circular, these apertures being respectively located so that the apertures 6, 6 are out of registry with the apertures 7, 7 for the purpose of preventing "run" of the material through the feeder. A feed wheel 8 is located within the throat 4, which feed wheel is provided with a plurality of pockets 9 for receiving the material to be advanced from the bin. As shown in Fig. 1, these pockets are formed by providing a plurality of radial spokes or fingers 10, the ends of which are tapered.

The wheel 8 is carried by a shaft 11 for rotation therewith, the shaft being rotated by any suitable driving device. The bottom 5 of the throat 4 is provided with an upwardly extending conical portion 12 which constitutes a bearing for the shaft 11. In this connection it is pointed out that the feed wheel 8 is provided with a corresponding conical portion 13 which houses the conical bearing 12. From the cone 13 the feed wheel extends horizontally outward in the form of a pocketed or spoked disc.

Extending downwardly from the hopper bottom to close proximity with the flat portion 14 of the wheel 8 I have provided a neck 15 for each of the openings 6, 6, which necks serve to confine the flow of material from the openings to the pockets of the feed wheel. As the wheel rotates material thus received by the pockets is advanced to the openings 7, 7, in the throat bottom and discharged into the delivery lines C. In this connection it is pointed out that the straight edge of the semi-circular openings 7, 7 is so disposed as to be at an angle to the arms or spokes 10 as they pass over the openings. The angle is such that the feed of the fuel by the arms 10 through the openings occurs first at the inner end of each arm and is finished at the outer end. This arrangement conduces to regularity of feed.

Each delivery line C comprises a nozzle 16, preferably tapered, and associated with an opening 7, and a Venturi-shaped member 17 surrounding the nozzle. The nozzle 16 and the member 17 are so disposed with one another that the nozzle terminates in the region of the venturi, or more specifically stated, the nozzle 16 is of such length that its end 18 lies substantially at the restricted portion 19 of the member 17.

An air inlet 20 is provided for the member 17, in this instance in the form of a horizontally extending pipe portion 21, which is connected to any suitable source of air supply. An air damper, not shown, may be provided for regulating the amount of air to be admitted.

From the foregoing it will be seen that the blast of air admitted at 20 serves to transport the fuel from the discharge end of the nozzles to the burners of an associated furnace, not shown, by means of pipes which may be connected to the members 17 by means of the flanges 22. By virtue of the venturi and the nozzles the pressure at the inlet end of the nozzles is lowered below atmospheric pressure whereby the flow of fuel into the discharge line is aided. It is also to be noted that this prevents the fuel from finding its way into the bearings of the feeding device. The conical bearing and wheel construction above mentioned also aids in this direction.

The particular arrangement of the nozzle and venturi above described is advantageous in that no change of direction in the travel of the fuel from the feeder to the discharge line takes place, although it is to be understood that in some cases I contemplate having the fuel enter the venturi at an angle.

I have provided gates or valves 23 for regulating the amount of fuel to be advanced from the hopper, which gates may be closed when it is desired to close off an opening entirely. If desired other gates may be provided for closing off the inlet to the discharge line when the line is out of use.

In order to avoid arching of the fuel in the bin or hopper over the openings 6, 6 in its bottom, a revolving arm or arms 24 are provided, which may be secured to the shaft 11 for rotation therewith. These arms sweep over the surface of the hopper bottom.

In order to control the proportion of fuel to the blast, the horizontal portion 21 of each air supply line may be connected with the enclosed space 25 between the bottom of the hopper and the bottom of the throat by means of pipes 26 and 27, a valve 28 being located at the junction of said pipes. Air entering this space in amount controlled by the valve mingles with the fuel passing into the nozzles 16 and facilitates the flow of fuel under action of the diminished pressure produced at the venturi.

I claim:—

1. In a feeder for pulverized coal and the like, the combination of a hopper having a pair of apertured bottoms spaced substantially apart, the aperture in one bottom being out of alignment with the aperture in the other bottom, a rotatable pocketed feed wheel adjacent one of said bottoms and spaced from the other bottom, and a neck confining the flow of material from the aperture in the last mentioned bottom to the feed wheel, said neck having capacity for sufficient material to fill a plurality of pockets.

2. In a feeder for pulverized coal and the like, the combination of a hopper having an apertured bottom, a throat extending downwardly from said bottom and having an apertured bottom, the aperture of which is out of alignment with the aperture in the hopper bottom, a rotatable feed wheel for passing the fuel entering said throat to the aperture in said throat bottom, a fitting associated with said last mentioned aperture having a nozzle and a venturi-shaped portion at the point of discharge of said nozzle and a delivery line adapted to be secured to said fitting.

3. In combination with a bin, a feeder comprising two spaced apertured plates, an intermediate pocketed plate, certain of said plates being stationary and the remainder rotatable for the purpose of advancing material from the bin, and a delivery line into which the material advanced is discharged, said line including a venturi-shaped portion at its inlet end with means for securing it to the feeder to receive the discharge therefrom, and means for admitting air to the delivery line at the venturi-shaped portion.

4. In combination with a bin, a feeder comprising two spaced apertured plates, an intermediate pocketed plate, certain of said plates being stationary and the remainder rotatable for the purpose of advancing material from the bin, and a delivery line into which the material advanced is discharged, said line having a venturi-shaped portion at its inlet end, a discharge nozzle terminating in the region of the venturi, means for admitting air to the venturi-shaped portion, and means for securing it to the feeder to receive the discharge therefrom.

5. In a feeder for pulverized coal and the like, the combination of a hopper having an apertured bottom, a throat extending downwardly from said bottom and having an apertured bottom, the aperture of which is out of alignment with the aperture in the hopper bottom, a rotatable feed wheel for passing the fuel entering said throat to the aperture in said throat bottom, a nozzle associated with said last mentioned aperture, and a delivery line having a venturi-shaped portion at the point of discharge of said nozzle, together with a valve controlled passage for leading air into the interior of the aforementioned throat.

6. In combination with a bin, a feeder comprising two spaced apertured plates, an enclosed chamber between said plates, a rotatable pocketed plate within said chamber for advancing material from the bin, a delivery line into which the material advanced is discharged, said line including a venturi-shaped portion in proximity to the point of discharge from the feeder, an air line for introducing air into the delivery line, and a valve controlled passage connecting the air line with the interior of the aforesaid enclosed chamber.

7. In a feeder for pulverized coal and the like, the combination of a hopper having an apertured bottom, a throat extending downwardly from said bottom and having an apertured bottom, the aperture of which is out of alignment with the aperture in the hopper bottom, a rotatable feed wheel for passing the fuel entering said throat to the aperture in said throat bottom, a nozzle associated with said last mentioned aperture, and a delivery line having a venturi-shaped portion at the point of discharge of said nozzle, together with means for introducing air under pressure into the interior of the aforementioned throat.

8. In combination with a bin, a feeder comprising two spaced apertured plates, an enclosed chamber between said plates, a rotatable pocketed plate within said chamber for advancing material from the bin, a delivery line into which the material advanced is discharged, and means for introducing pressure air into the interior of the aforesaid enclosed chamber.

9. In combination with a bin, a feeder comprising two spaced apertured plates, an enclosed chamber between said plates, a rotatable pocketed plate within said chamber for advancing material from the bin, a delivery line into which the material advanced is discharged, an air line for introducing air into the delivery line, and a passage for leading air from the air line into the interior of the aforesaid enclosed chamber.

10. In combination with a bin, a feeder comprising two spaced apertured plates, an enclosed chamber between said plates, a rotatable pocketed plate within said chamber for advancing material from the bin, a delivery line into which the material advanced is discharged, an air line for introducing air into the delivery line and a passage for leading air from the air line into the interior of the aforesaid enclosed chamber, together with means for regulating the pressure of the air in said chamber with relation to the pressure of the air in the delivery line.

11. In a feeder for pulverized coal and the like, the combination of a hopper having a pair of apertured bottoms spaced substantially apart, the aperture in one bottom being out of alignment with the aperture in the other bottom, a rotatable feed wheel adjacent one of said bottoms and spaced from the other bottom, and a neck confining the flow of material from the aperture in the last mentioned bottom to the feed wheel, said neck increasing in area toward the feed wheel.

12. In a feeder for pulverized coal and the like, the combination of a hopper having a pair of apertured bottoms spaced substantially apart, the aperture in one bottom being out of alignment with the aperture in the other bottom, a rotatable pocketed feed wheel adjacent one of said bottoms and spaced from the other bottom, and a neck confining the flow of material from the aperture in the last mentioned bottom to the feed wheel, said neck being located in the space between the last mentioned bottom and the feed wheel.

In testimony whereof I have hereunto signed my name.

FAY HARRY ROSENCRANTS.